United States Patent [19]

Kurowsky

[11] 4,065,607
[45] Dec. 27, 1977

[54] TERPOLYMERS OF MALEIC ANHYDRIDE AND THEIR USE AS SCALE CONTROL AGENTS

[75] Inventor: Stephen R. Kurowsky, East Lyme, Conn.

[73] Assignee: Pfizer Inc., New York, N.Y.

[21] Appl. No.: 780,483

[22] Filed: Mar. 23, 1977

[51] Int. Cl.² .................. C08F 22/00; C08C 19/00; C08F 34/02; C08F 222/04
[52] U.S. Cl. ................ 526/15; 159/DIG. 13; 203/7; 210/23 R; 210/58; 252/180; 526/47; 526/49; 526/271; 526/272
[58] Field of Search .............. 526/271, 272, 15, 47, 526/49; 203/7; 159/DIG. 13; 210/58

[56] References Cited

U.S. PATENT DOCUMENTS

| | | | |
|---|---|---|---|
| 2,565,147 | 8/1951 | Pfluger | 526/272 |
| 2,921,928 | 1/1960 | Fields | 526/272 |
| 3,015,653 | 1/1962 | Richards et al. | 526/272 |
| 3,359,246 | 12/1967 | Berry | 526/271 |
| 3,516,910 | 6/1970 | Engman et al. | 203/7 |
| 3,711,574 | 1/1973 | Jaworek et al. | 526/271 |
| 3,715,307 | 2/1973 | Johnson et al. | 210/58 |
| 3,755,264 | 8/1973 | Testa | 526/271 |
| 3,810,834 | 5/1974 | Jones et al. | 210/58 |
| 3,897,209 | 7/1975 | Harris et al. | 210/58 |
| 3,965,027 | 6/1976 | Boffardi et al. | 210/58 |

FOREIGN PATENT DOCUMENTS 1,414,918 11/1975 United Kingdom .................. 210/58

*Primary Examiner*—Herbert J. Lilling
*Attorney, Agent, or Firm*—Connolly and Hutz

[57] ABSTRACT

Terpolymers of maleic anhydride, acrylamide or methacrylamide and a third monomer consisting of octene, styrene and the like.

Copolymers of maleic anhydride and acrylamide or methacrylamide.

Use of the hydrolyzed form of the terpolymer as a scale control agent.

Novel process employing a mixture of aromatic and ketonic solvent and a temperature of at least 120° C. which renders the polymers of the invention insoluble in water at ambient temperature.

12 Claims, No Drawings

TERPOLYMERS OF MALEIC ANHYDRIDE AND THEIR USE AS SCALE CONTROL AGENTS

BACKGROUND OF THE INVENTION

Acute shortage of potable water in some areas of the world is a problem for which sea water is seen as an answer. Conversion of it to fresh water by various desalination processes, however, is plagued by a technological problem resulting from the nature of the inorganic salts contained in the sea water. They have low aqueous solubility and their precipitates can hinder the mechanism or manner of the particular desalination process used, examples of such effects being the blockage of semipermeable membranes of an osmotic process and the reduction of heat transfer of a distillation process. This will lower the efficiency of the desalination and ultimately cause such deterioration of performance that the desalination process must be stopped and the apparatus cleaned or replaced.

These salt precipitates are commonly known as scale and scale control research has been based upon the use of chemical agents, usually polymers, to control scale deposition although some have included surfactants. A common use-trait of most control agents is the very low ratio of agent to inorganic salt necessary to contain and retard precipitation. Thus, it is inferrable that the control effect is caused by complexation at the crystal growth site which repells incoming nuclei and not chelation of the inorganic cations of the salt.

The most common polymers selected for use as scale control agents are polymethacrylic acid, polyacrylic acid and polymaleic acid and their copolymers with monomers such as acrylamide and vinyl acetate. Some of the more recently developed scale control polymers are Hydrolyzed Polymaleic Anhydride (U.S. Pat. No. 3,810,832); Maleic Anhydride-Vinyl Acetate Copolymer (U.S. Pat. No. 3,715,307); Hydrolyzed Copolymer of Maleic Anhydride and Monoethylenically Unsaturated Monomer or Mixtures Thereof (GB 1414918); Maleic Anhydride Copolymers and Terpolymers (Dutch Pat. Application O.I.N. 7506874); Acrylic Acid Polymers (U.S. Pat. No. 3,514,376); Methacrylic Acid Polymer (U.S. Pat. No. 3,444,054); Maleic Acid Copolymers (U.S. Pat. No. 3,617,577); Styrene-Maleic Anhydride Copolymers (U.S. Pat. No. 3,289,734); and Polyacrylic Acid (U.S. Pat. No. 3,293,152).

A comparison of the nature of the polymer and the scale control activity as described by the prior art given supra, suggests that lowering the molar ratio of the maleic anhydride moiety to other monomer moieties in copolymers or terpolymers so composed will decrease both the charge density and the scale control activity. For example, the scale control data recorded for the polymers of GB 1414918 reveals that the activity against calcium carbonate precipitation decreases when progressing through the set of activities associated with homomaleic anhydride polymer through maleic anhydride-acrylamide copolymer to maleic anhydride-vinyl acetate-ethyl acrylate terpolymer. The same trend is apparent from a correlation of the scale control activities of the polymers of Dutch application 7506874. When the ratio of maleic anhydride portion to other monomer portion in the test polymer formed according to that application is decreased, the activity against calcium carbonate precipitation decreases. Thus, the literature teaches that the use of non-carboxylic acid monomers in conjunction with maleic anhydride monomer to form a polymer of mixed composition will cause a decrease in the scale control activity of that polymer relative to hydrolyzed polymaleic anhydride.

As is true for most polymers, the method used in preparing the scale control polymer will influence its nature and activity independent of the relative ratios of monomers used. General methods for the preparation of scale control polymers are described in U.S. Pat. No. 3,755,264, and U.S. Pat. No. 3,359,246, in addition to the methods contained in the patents describing use, supra. Although this prior art gives a wealth of information on how to prepare maleic anhydride and/or acrylic acid polymers, in practice, these preparation methods often lead to uncontrollable polymerization rates, the Tromsdorff effect, gelling and gumming of the polymers during polymerization, failure to control the magnitude and range of polymer molecular weight, impractical long polymerization times, and the unsafe nature of the reaction.

In view of the methods of preparation and suggestions of activity of the prior art it is surprising to discover that an interplay of monomer composition, temperature and reaction solvent according to the present invention allows the preparation of novel granular maleic anhydride terpolymer which has a controlled molecular weight range and is low in maleic anhydride content but nevertheless has scale control activity approximating that of hydrolyzed polymaleic anhydride. The novel process can also be employed to prepare useful maleic anhydride copolymers which are granular and readily processed.

SUMMARY OF THE INVENTION

The present invention comprises a terpolymer consisting essentially of 30–55 mole percent maleic anhydride, 30–65 mole percent acrylamide or methacrylamide and 5–15 mole percent third monomer selected from the group consisting of styrene, α-methyl styrene, alkyl acrylate or alkyl methacrylate having 1 to 8 carbon atoms in the alkyl group and 1-alkene having 4 to 10 carbon atoms and a copolymer consisting essentially of 30 to 70 mole percent maleic anhydride and 30 to 70 mole percent acrylamide or methacrylamide.

The terpolymer or copolymer is characterized by a relative viscosity of about 1.02 to 1.10 in dimethylsulfoxide at a concentration of 0.5 grams per deciliter; by solubility of less than 0.10 g. per g. of solution (water) at ambient temperature and by substantial freedom from unreacted monomer.

The terpolymers of the present invention have a preferred solubility of less than 0.06 g. per g. of solution (water).

A terpolymer composition wherein the third monomer is styrene is preferred because of the favorable balance of scale control activity and hydrophobicity of its hydrolyzed form. A preferred monomer ratio of this terpolymer consists essentially of 30 to 50 mole percent maleic anhydride, 40 to 55 mole percent acrylamide and 5 to 15 mole percent styrene. A more preferred monomer ratio of this terpolymer consists essentially of 41 to 45 mole percent maleic anhydride, 45 to 49 mole percent acrylamide and 9 to 13 mole percent styrene.

A further feature of the present invention is the process used to prepare the above described terpolymers and copolymers. It allows isolation of the polymer as a granular precipitate rather than as a gum, a resin or an oil, and is one which causes the resultant polymer to be insoluble in water at ambient temperature. It is believed this insolubility is the result of a rearrangement of the chemical structure of the polymer; but not withstanding that view the insolubility is definitely related to the heat and solvent interplay of the reaction process. Most likely the process acts to form a substantial number of imide moieties along the polymer backbone by causing the recombination of the anhydride moiety of the maleic anhydride fragments with the amide moiety of the acrylamide fragments. The theorized imide moieties in turn then cause the observed insolubility. Additional insolubility in the terpolymer series is caused by the hydrophobicity of the third monomer.

To obtain the desired insolubility in water at ambient temperature and granular precipitate formation, it is necessary to employ reaction temperatures of at least 120° C. and a chain transfer solvent or mixture thereof which has a propensity for free radical abstraction, has a polarity greater than that of toluene, will enter into the polymerization chain reaction, and will not allow swelling or agglomeration of the formed particulate polymer.

The water insolubility of the polymer can be used to advantage in the purification. Slurrying the crude reaction polymer in cold water will dissolve the water soluble monomers leaving the polymer substantially free of unreacted monomer. In this manner, potential contamination of the desalination process by residual monomer is avoided.

In addition the present invention comprises a method for the prevention of scale formation when heating or desalinating water containing scale forming impurities such water being sea water, boiler water, water with calcium and magnesium cations and other similarly impure forms of water. The method comprises mixing with said water the hydrolyzed form of a terpolymer consisting essentially of 30 to 55 mole percent maleic anhydride, 30 to 65 mole percent acrylamide or methacrylamide and 5 to 15 mole percent third monomer as described supra to make a concentration of the hydrolyzed form of the terpolymer in water of at least 2 parts per million and wherein the unhydrolyzed terpolymer is as characterized supra. A preferred method of treatment employs a terpolymer wherein the third monomer is styrene. A more preferred method of treatment employs a terpolymer consisting essentially of 41 to 46 mole percent maleic anhydride, 45 to 49 mole percent acrylamide and 9 to 13 mole percent styrene.

DETAILED DESCRIPTION OF THE INVENTION

The compounds of the present invention have unexpected characteristics which are believed to result from the presence of a substantial number of imide moieties along the polymer backbone and from the hydrophobic effect of the third monomer moiety. The supposition in essence is that the imide groups along the polymer chain as five and six membered rings and across polymer chains as bridges are created by the process of the present invention by a recombination of the anhydride and amide moieties of the polymer while it is being formed.

The novel insolubility in water at ambient temperature which is present in the terpolymers of the present invention can be generated in maleic anhydride-acrylamide copolymers of the present invention as well by employing the process of the present invention. Observation of this effect in the copolymers lends support to the idea that the insolubility in either type of polymer of the present invention is caused mainly by the presence of the imide moiety and that the obvious hydrophobic effect of the third monomer in the terpolymer is supplementary.

The reaction parameters necessary to obtain the desired transformation during polymerization are high and similar molar quantities of the anhydride and acrylamide monomers, temperature, solvent and for the terpolymer, mode of addition of the third monomer. These are critical for the successful outcome and provide the necessary conditions to obtain the novel insolubility.

The temperature requirement for the reaction process is at least 120° C. and this may be achieved by applying pressure when employing solvents which boil at lower temperatures at atmospheric pressure. The upper limit of the range will depend on the controllability of the reaction rate and on the reflux temperature of the solvent or mixture thereof provided that the employed solvent or mixture thereof boils at a temperature higher than 120° C. The preferred temperature employed is that of refluxing solvent and is usually within the range of 125° to 150° C.

The time parameter of the reaction will vary according to the particular starting materials used. The usual course of the polymerization can be followed by observing the precipitation of the polymer as fine particulate granules, and the polymerization is substantially complete when precipitation ceases. The total time period is usually within the range of 1 to 10 hours and the most frequent time period observed is approximately 2 hours.

The reaction solvents used in the process of the present invention are reactive; in other words, they enter into the chain propagation and termination steps of the polymerization. They include alkyl substituted benzenes such as toluene, xylene, mesitylene, ethyl benzene and propyl benzene, and aliphatic ketones and cycloalkyl ketones such as methyl ethyl ketone, acetone, 4-methyl-2-pentanone, cyclohexanone, dibutylketone, dipropylketone, and other similar aromatic and ketonic organic liquid solvents. The process employs a mixture of the aromatic solvent and the ketone solvent at ratios of 15 to 85 weight percent ketone solvent to 15 to 85 weight percent aromatic solvent. The relative proportions selected in a given case will depend upon the nature of the particular polymer being formed. But, in general, these ratios will insure that the polymer will not agglomerate or swell during its formation.

Any free radical initiator capable of initiating a free radical reaction may be used in the process. Typical initiators include di-t-butyl peroxide, benzoyl peroxide, azobisisobutyronitrile, dicumyl peroxide and dilauroyl peroxide. Although the weight ratio of initiator to monomer will vary according to the particular monomers used, the range is usually from 2 to 20 weight percent based upon total monomers.

In accordance with these reaction parameters, a terpolymer of the present invention is formed by first contacting from 30 to 55 mole percent maleic anhydride with from 30 to 65 mole percent acrylamide or methacrylamide in the appropriate reaction solvent. The mixture is heated to the appropriate temperature, and the free radical initiator, and from 5 to 15 mole percent third monomer, described supra, each dissolved in the reaction solvent, are then added to the reaction mixture, preferably at such a rate so as to complete addition within a time period of from 15 to 180 minutes. The usual rate-of-addition time period is approximately 30 to 60 minutes.

To form a copolymer of the present invention, from 30 to 70 mole percent maleic anhydride is contacted with from 30 to 70 mole percent acrylamide or methacrylamide in the same manner as that described for the terpolymers except that the third monomer is omitted.

The reaction is preferably conducted under an inert atmosphere, e.g., nitrogen.

Agitation of the reaction mixture is preferably maintained throughout the course of the reaction, e.g., by stirring or sparging.

Isolation of the polymer can be accomplished by any of the standard techniques available and known to the art. The usual method is concentration of the reaction medium by evaporation, filtration and subsequent slurrying of the filtered solids with cold water to dissolve unreacted monomer. This will yield polymer substantially free of unreacted monomer. Other methods include washing the filtered reaction material with organic solvents such as ether, tetrahydrofuran, chloroform, carbon tetrachloride and similar nonpolar, nonhydroxylic organic solvents.

The polymer is then prepared for scale control use by hydrolysis in refluxing water. The process for conversion of the insoluble polymer to soluble, hydrolyzed polymer usually requires 6 to 10 hours. Alternatively, the polymer can be hydrolyzed by stirring it with 0.1 to 4 molar aqueous sodium hydroxide at temperatures in the range of 25°–100° C.

The alkali metal, and ammonium salts of the hydrolyzed terpolymer can be formed by adding the alkali metal base, ammonia or organic amine to the water solution of the hydrolyzed terpolymer or by employing the base directly to hydrolyze the unhydrolyzed terpolymer. Subsequent evaporation of the water will allow isolation of the desired terpolymer salt or it may be used directly in aqueous solution without isolation. Common alkali metal bases include sodium hydroxide, potassium hydroxide and lithium hydroxide. Common ammonium bases and amines include ammonium hydroxide, ammonia, mono-, di-, and trialkyl amines having from 1 to 5 carbon atoms in each alkyl group, pyridine, morpholine and lutidine.

The characteristic insolubility in water at ambient temperature of the terpolymers and copolymers of the present invention is displayed in Table I. It was determined by allowing a mixture of 25 weight percent polymer to distilled water to stir at room temperature for 3 hours followed by removal of the liquid phase. The dissolved polymer was then recovered from the liquid phase by freeze drying the solution and both this material and the insoluble polymer were oven dried at 25° over phosphorous pentoxide in a 0.1 torr vacuum for approximately two days. The weights of the dissolved and insoluble polymer were compared for mass balance and recorded as the solubility behavior in grams of polymer dissolved per gram of solution for that particular composition. The polymer of method A which was chosen for comparison was prepared according to the general method provided by U.K. Pat. No. 1,414,918.

To demonstrate that insolubility was not time related, the terpolymer listed on Table 1 was allowed to stir for two days in the same manner and proportions as described supra. After two days of stirring at ambient temperature, the polymer was isolated in the same manner as before and had a solubility of 0.0408 g. per g. of solution.

A comparison (Table I) of the solubility behavior of the polymers of the present invention to that of the polymer of Method A shows the dramatically different solubility characteristics of the polymers of the present invention. The explanation for the lack of water insolubility of the polymer of method A is apparent from a comparison of the process to make it with the process of the present invention (compare Method A with Example 8). The polymerization temperature is higher in the method of this invention (at least 120° as compared to the range of 70° to 110° for Method A) and a mixture of aromatic and ketone solvent is employed. The result is that the necessary conditions are provided by the process of the present invention to cause the novel insolubility in water at ambient temperature which is believed to be allied with the production of imide moieties in the co- and terpolymers.

Table 1

| Polymer Composition (mole percent based on analysis) | | Example No. | Solubility Behavior (g. of polymer dissolved per g. of solution) |
|---|---|---|---|
| 49 | maleic anhydride | 8 | 0.058 |
| 51 | acrylamide | | |
| 29 | maleic anhydride | 10 | 0.080 |
| 71 | acrylamide | | |
| 46 | maleic anhydride | 9 | 0.073 |
| 54 | methacrylamide | | |
| 43 | maleic anhydride | | |
| 46 | acrylamide | 1 | 0.050 |
| 11 | styrene | | |
| 58.4 | maleic anhydride | method (A) | polymer completely dissolved |
| 41.7 | acrylamide | | |

The scale inhibitor activity of the hydrolyzed terpolymers of the present invention was determined by measuring the amount of precipitate formed upon heating under pressure a standard solution of synthetic sea water containing the added terpolymer scale inhibitor. The procedure and results are given in Example 11 and they are to be compared to two types of controls, one employing no agent, and the other employing polymaleic acid (formed according to the methods given in U.K. 1,414,918). These results demonstrate that although the charge density of the instant hydrolyzed terpolymers has been reduced relative to that of polymaleic acid and their hydrophobicity has been increased, the hydrolyzed terpolymers of the present invention have significant scale inhibitor activity which is approximately equal to that of polymaleic acid. It is postulated that the hydrolyzed terpolymers of the present invention operate through a threshold mechanism of scale control where binding of the hydrolyzed terpolymer to the crystal nuclei growing site inhibits further crystal growth at that site and the hydrophobicity of the third monomer contained in the bound terpolymer repells the incoming polar water cage containing the solubilized inorganic ions.

The following examples are merely illustrative and are in no way to be construed as limiting the scope of the claims.

All temperatures are in degrees Centigrade and if not specified are ambient temperature.

The infrared spectra were obtained on a Perkin-Elmer IR-21 grating spectrophotometer and are listed in microns.

The viscosity measurements which were used to calculate the molecular weight of the polymers were conducted in the standard manner with a Ubbelohde Viscometer by employing a solution of 0.5 gram of the polymer in 100 milliliters of dimethylsulfoxide at 25 ± 0.01° C. The viscosity measured was the relative viscosity ($\eta$) which is defined as $\eta = t/t_o$ where $t$ equals the flow time in seconds of the polymer solution and $t_o$ equals the flow time in seconds of the solvent.

METHOD A

Copolymer (A) of Maleic Anhydride and Acrylamide formed according to the method of U.K. 1,414,918.

A solution of 46.5 g (0.474 moles, 71.4 mole %) of maleic anhydride, 13.5 g (0.190 moles, 28.6 mole %) of acrylamide and 143.0 g of toluene was stirred and heated under a nitrogen atmosphere until a temperature of 70° was reached. To the solution was then added a solution of 12.0 g (20 wt. %) benzoyl peroxide in 70.0 g toluene over a period of five minutes. The solution was then refluxed at 110° C. to 113° for 6 hours. After cooling, the toluene solution was decanted from the resinous material which was purified by triturating with benzene. There was obtained a 63% yield of copolymer A having a relative viscosity of 1.04.

Copolymer A composition as determined by CHN analysis:
58.4 mole % maleic anhydride
41.7 mole % acrylamide.

EXAMPLE 1

Terpolymer (1) of Maleic Anhydride, Acrylamide and Styrene

Into a four neck 2000 ml round bottom flask equipped with a reflux condenser and mechanical stirrer was added 150.0 gms (1.53 moles, 45 mole %) maleic anhydride, 108.8 gms. (1.53 moles, 45 mole %) acrylamide, 235.0 gms methyl isobutyl ketone and 235.0 gms xylene. The system was sparged with nitrogen and then the flask was lowered into an oil bath maintained at 150° C and as the reaction mixture warmed, formed a solution. When gentle refluxing was achieved at a reaction mixture temperature of 126° to 130°, the solution of free radical initiator consisting of 14.71 gm di-t-butyl peroxide, 16.0 gm methyl isobutyl ketone and 16.0 gm xylene was added continuously at such a rate so as to complete addition in 30 minutes. Simultaneously a solution of third monomer consisting of 35.4 gm (0.340 mole, 10 mole %) styrene, 29.0 gm methyl isobutyl ketone and 29.0 xylene was added continuously at such a rate so as to complete addition in 60 minutes. During and following third monomer addition, the polymer precipitated as a fluid reaction slurry. After polymerization was substantially complete, 2 hours, the polymerization mixture was allowed to cool to room temperature, filtered, and the precipitate washed with diethyl ether and vacuum oven dried at 80° C for 17 hours. Alternatively, the precipitate may be washed with water and vacuum oven dried. The resulting tan colored free flowing powder terpolymer 1 was obtained in 87.6% yield and had a relative viscosity of 1.04.

Terpolymer 1 composition as determined from CHN analysis:
43 mole % maleic anhydride
46 mole % acrylamide
11 mole % styrene.
IR (KBr) 2.94, 3.02, 5.42, 5.64, 5.80, 5.86, 6.05, 6.22, and 8.40 $\mu$.

The other terpolymers of the present invention can be prepared according to the procedure of Example 1 by substituting the appropriate monomers at the appropriate ratio for those of Example 1.

EXAMPLE 2

Terpolymer (2) of Maleic Anhydride, Acrylamide and Styrene

The terpolymer 2 was prepared according to the procedure of Example 1 by employing the same mole percent ratios of monomers but by substituting the solvent ratio 75 wt. % methyl isobutyl ketone, 25 wt. % xylene for that of Example 1. There was obtained an 87.5% yield of free-flowing powdery terpolymer 2 having a relative viscosity of 1.04.

Terpolymer 2 composition as determined by CHN analysis:
43 mole % maleic anhydride
47 mole % acrylamide
10 mole % styrene.
IR spectrum (KBr) identical to that of terpolymer 1.

EXAMPLE 3

Terpolymer (3) of Maleic Anhydride, Acrylamide and Styrene

The terpolymer 3 was prepared according to the procedure of Example 1 by substituting the monomer ratios 55 mole % maleic anhydride, 35 mole % acrylamide and 10 mole percent styrene for those of Example 1. There was obtained an 88.1% yield of free flowing granular terpolymer 3 having a relative viscosity of 1.04.

Terpolymer 3 composition as determined by CHN analysis:
50.98 mole % maleic anhydride
35.5 mole % acrylamide
13.4 mole % styrene.
IR spectrum (KBr) identical to that of terpolymer 1.

EXAMPLE 4

Terpolymer (4) of Maleic Anhydride, Acrylamide and Styrene

Terpolymer 4 was prepared according to the procedure of Example 1 by employing the same monomer ratio but by substituting dicumyl peroxide for di-t-butyl peroxide on an equimolar basis. There was obtained an 88.2% yield of granular terpolymer 4 having a relative viscosity of 1.039.

Terpolymer 4 composition as determined by CHN analysis:
44.5 mole % maleic anhydride
44.6 mole % acrylamide
10.9 mole % styrene.
IR spectrum (KBr) identical to that of terpolymer 1.

EXAMPLE 5

Terpolymer (5) of Maleic Anhydride, Acrylamide and 1-Octene

Into a flask was added 183.4 gm (1.871 moles, 55 mole %) maleic anhydride, 72.5 gm (1.021 moles, 30 mole %) acrylamide, 215.0 gm methyl isobutyl ketone and 215.0 gm xylene. The system was sparged for 1.5 hrs. with nitrogen, and then it was lowered into an oil bath maintained at 150° C. With gentle refluxing was achieved at a reaction mixture temperature of 126° to 130°, a solution consisting of 31.3 gm dicumyl peroxide, 36.0 gm methyl isobutyl ketone and 36.0 gm xylene was added dropwise over a period of 1 hr. Simultaneously a solution consisting of 57.3 gm (0.510 mole, 15 mole %) 1-octene, 47.0 gm methyl isobutyl ketone and 47.0 gm xylene was added dropwise over a period of 0.5 hr. After polymerization was substantially complete, 4.0 hrs; the reaction was allowed to cool. The particulate terpolymer was filtered, washed with excess diethyl ether, and vacuum oven dried at approximately 90° C. There was obtained a 56% yield of tan-colored, free-flowing, powder, terpolymer 5 having a relative viscosity of 1.040.

Terpolymer 5 composition as determined from CHN analysis:
50.9 mole % maleic anhydride
41.2 mole % acrylamide
7.85 mole % 1-octene
IR spectrum (KBr) was similar to that of terpolymer 1.

EXAMPLE 6

Terpolymer (6) of Maleic Anhydride, Methacrylamide and Styrene

Terpolymer 6 was prepared according to the procedure of Example 1 by substituting methacrylamide for acrylamide at the same mole % ratio. There was obtained a 95% yield of granular terpolymer 6 having a relative viscosity of 1.053.

Terpolymer composition as determined by CHN analysis:
42.8 mole % maleic anhydride
46.7 mole % methacrylamide
10.3 mole % styrene

EXAMPLE 7

Terpolymer (7) of Maleic Anhydride, Acrylamide and Alpha-Methyl Styrene

Terpolymer 7 was prepared according to the procedure of Example 1 by substituting alpha methyl styrene for styrene at the same mole % ratio. There was obtained an 89.4% yield of granular terpolymer 7 having a relative viscosity of 1.046.

Terpolymer 7 composition as determined by CHN analysis:
44.5 mole % maleic anhydride
44.9 mole % acrylamide
10.9 mole % alpha methyl styrene

EXAMPLE 8

Copolymer (8) of Maleic Anhydride and Acrylamide

To a four neck 2000 ml round bottom flask equipped with a mechanical stirrer, $N_2$ inlet, cold water condenser and thermomemter was added 150.0 gms (1.53 moles, 50 mole %) maleic anhydride, 108.7 gms (1.53 moles, 50 mole %) acrylamide, 224.0 gms 4-methyl-2-pentanone and 224.0 gms xylene. The mixture was stirred at room temperature and sparged with nitrogen for 15 min. Then, the system was lowered into an oil bath maintained at 130° C and at 60° C the solid starting materials dissolved. When the solution was refluxing gently, at a temperature of 126° to 130°, a solution of 12.98 gms (10 wt %) di-t-butyl peroxide, 16.0 gms methyl isobutyl ketone and 16 gms xylene was added dropwise over a period of 30 min. Upon addition of the initiator, polymer precipitation occurred. After 1 hour a second solution consisting of 12.98 gms di-t-butyl peroxide and 112.5 gms xylene was added dropwise to the polymerizing medium over a 2 hour period. The polymerization was allowed to continue for an additional hour after which the dispersion-like mixture was cooled to room temperature, the precipitate filtered, washed with diethyl ether and vacuum oven dried at 90° C. Alternatively, the precipitate may be washed with water and vacuum oven dried. There was obtained an 89.6% yield of free flowing powder copolymer 8 having a relative viscosity of 1.05.

Copolymer composition as determined from CHN analysis:
49 mole % maleic anhydride
51 mole % acrylamide.
IR spectrum (KBr) 2.94, 3.02, 5.43, 5.65, 5.86, 6.02, 6.20 and 8.45μ.

The other copolymers of the present invention can be synthesized according to the procedure of Example 8 by substituting the appropriate monomers at the appropriate ratio for those of Example 8.

EXAMPLE 9

Copolymer (9) of Maleic Anhydride and Methacrylamide

Copolymer 9 was prepared according to the procedure of Example 6 by omitting the styrene monomer. There was obtained an 85% yield of free flowing, powdery copolymer 9 having a relative viscosity of 1.05.

Copolymer composition as determined by CHN analysis:
46 mole % maleic anhydride
54 mole % methacrylamide.
IR spectrum 2.96, 3.03, 5.45, 5.65, 5.80, 5.86, 6.02, 6.25 and 8.23μ.

EXAMPLE 10

Copolymer (10) of Maleic Anhydride and Acrylamide

Copolymer 10 was prepared according to the procedure of Example 8 by substituting 25 mole % maleic anhydride and 75 mole % acrylamide for those monomer ratios of Example 8. There was obtained a 96.7% yield of free flowing, powdery copolymer 10 having a relative viscosity of 1.10.

Copolymer composition from CHN analysis:
71.8 mole % acrylamide
28.2 mole % maleic anhydride.

EXAMPLE 11

Scale Inhibitor Activity of the Polymers of Examples 1 through 10

Synthetic sea water was made by dissolving the following weights of inorganic salts in one liter of distilled water: NaCl, 26.5 gm; $MgCl_2$, 2.4 gm; $MgSO_4$, 3.3 gm; $CaCl_2$, 1.1 gm; KCl, 0.72 gm; $NaHCO_3$, 0.245 gm; and NaBr, 0.08 gm.

To conduct the test, a 1.0 ml aliquot of a 0.1% aqueous solution of the hydrolyzed polymer was added to a beaker containing 166 ml. of synthetic sea water and monel foil, 1 inch square. The test beaker and a positive control beaker containing 166 ml sea water, 1.0 ml of a 0.1% aqueous solution of polymaleic acid (prepared according to the method of U.K. Pat. No. 1,414,918) and a 1 inch square monel foil were placed in an autoclave (pressure cooker) containing a stirrable 10% aqueous lithium chloride solution. The pressure relief valve of the autoclave was set at 10 psi so that the boiling point of the sea water sample would be elevated to 115° C. and the autoclave was closed and heated until steam started to escape through the relief valve (20 to 30 min). Heating was continued for 45 min after which the autoclave was allowed to cool. When the internal pressure of the autoclave decreased to atmospheric pressure, control and sample beakers were removed and cooled in a 25° C. water bath. Each beaker was analyzed separately as follows. The monel foil was removed and rinsed with 50 ml of 6N HCl to remove any scale formed. The final volume of sea water was measured and the amount evaporated calculated. The sea water was filtered through a 0.2 micron cellulosic membrane filter to collect the precipitate formed and the acid used to wash the monel foil was passed slowly through the filter to dissolve the precipitate. The volume of the acid solution was then measured and the amount of calcium and/or magnesium compounds precipitated was measured by EDTA titration of an aliquot of the acid wash. A total of four test samples and four positive control samples were run and the averages and standard deviations computed. The amount of water lost was also averaged and the standard deviation found. It was calculated as the percent of the total amount and expressed as percent evaporation. The positive control averages and their percent evaporations were compared to a table of scale depositions versus percent evaporations for polymaleic acid which was of the same type and source as Table III contained herein. The comparison was used to assure that nothing abnormal had occurred during the test.

The averaged results of the scale control test using each of the various Example polymers of the present invention are recorded on Table II as milliequivalents of EDTA complexed calcium/magnesium along with the results from a test on a null control (test using no scale control polymer). The percent evaporation is recorded on Table II in conjunction with the average scale result.

In order to compare the scale control activity of the test polymers to that of the positive control, polymaleic acid, it was necessary first to ascertain what effect the amount of evaporation had on the scale deposition. Assuming that the positive standard for comparison was polymaleic acid, and that the percent evaporation was mainly a function of the apparatus and the test conditions and not the identity of the scale control agent, such a determination was made by repeatedly testing polymaleic acid as a scale control agent under the above described experimental conditions. The amounts of scale deposition from each test which fell within each 0.6 percent evaporation increment starting at 12% evaporation were averaged and the mean deviation of each average was calculated. These averages and their respective evaporation ranges are presented on Table III.

Using the data from Table III, the performance of the Example polymers as scale control agents can be compared with the performance of polymaleic acid. After selecting the range increment for percent evaporation from Table III in which the percent evaporation for the Example polymer in question would fall, the average scale for that range increment from Table III is compared to the Sample average scale for the Example polymer in question from Table II. If the Example polymer "Sample Average Scale" value is lower than the corresponding Average Scale value for polymaleic acid, then the Example polymer is a more active scale control agent than polymaleic acid. When considering this comparison, the spread of both the Sample average scale values and the polymaleic acid scale values should be taken into account in order to judge the merits of the Example polymers as scale control agents relative to the merits of the positive standard, polymaleic acid.

TABLE II

SCALE CONTROL ACTIVITY OF THE HYDROLYZED EXAMPLE POLYMERS

| Polymer Example No. (hydrolyzed polymer) | Sample Avg. Scale (meq) | Std. Dev. | Avg. Ev. (%) | Std. Dev. |
|---|---|---|---|---|
| 1 | 0.102 | 0.028 | 15.1 | 1.5 |
| 2* | 0.158 | 0.039 | 13.6 | 1.8 |
| 3 | 0.080 | 0.008 | 13.0 | 0.6 |
| 4 | 0.079 | 0.028 | 13.6 | 0.6 |
| 5* | 0.143 | 0.023 | 15.4 | 1.4 |
| 6 | 0.149 | 0.046 | 14.9 | 1.6 |
| 7 | 0.073 | 0.026 | 12.3 | 0.7 |
| 8* | 0.149 | 0.015 | 15.3 | 1.2 |
| 9 | 0.110 | 0.060 | 15.9 | 1.2 |
| 10 | 0.115 | 0.032 | 15.5 | 2.4 |
| Null Control | 0.200 | 0.005 | 15.0 | 2.4 |

*Both the amount of sample scale and the amount of positive control scale (polymaleic acid) deposited during the test runs for these Examples were abnormally high, e.g. for 2 the avg. scale deposited for polymaleic acid during that particular test was 0.127; for 5 it was 0.148 and for 8 it was 0.15.

TABLE III

SCALE DEPOSITION AS A FUNCTION OF PERCENT EVAPORATION USING POLYMALEIC ACID AS A SCALE CONTROL AGENT

| Percent Evaporation Range | Average Scale found (meq.) | Mean Deviation |
|---|---|---|
| 12.0–12.6 | 0.065 | ±0.013 |
| 12.6–13.2 | 0.075 | ±0.003 |
| 13.2–13.8 | 0.081 | ±0.007 |
| 13.8–14.4 | 0.106 | ±0.010 |
| 14.4–15.0 | 0.117 | ±0.009 |
| 15.0–15.7 | 0.119 | ±0.004 |

What is claimed is:

1. A polymeric agent comprising a terpolymer, its hydrolyzed form, and the alkali metal, amine and ammonium salts thereof, said terpolymer consisting essentially of 30 to 55 mole percent maleic anhydride, 30 to 65 mole percent acrylamide or methacrylamide and 5 to 15 mole percent third monomer selected from the group consisting of styrene, α-methyl styrene, alkyl acrylate or alkyl methacrylate having from one to eight carbon atoms in the alkyl group and 1-alkene having from four to ten carbon atoms, said terpolymer being characterized by a relative viscosity of about 1.02 to 1.10 in dimethyl sulfoxide at a concentration of 0.5 g. per deciliter, and by solubility of less than 0.10 g. per g. of solution (water) at ambient temperature.

2. A terpolymer of claim 1 wherein said third monomer is styrene.

3. A terpolymer of claim 1 consisting essentially of 35 to 50 mole percent maleic anhydride, 40 to 55 mole percent acrylamide and 5 to 15 mole percent styrene.

4. The terpolymer of claim 1 consisting essentially of 41 to 45 mole percent maleic anhydride, 45 to 49 mole percent acrylamide and 9 to 13 mole percent styrene.

5. A hydrolyzed form of a terpolymer of claim 1.

6. The hydrolyzed form of the terpolymer of claim 4.

7. An alkali metal and ammonium salts of a hydrolyzed terpolymer of claim 1.

8. The alkali metal and ammonium salts of a hydrolyzed terpolymer of claim 4.

9. A process for preparing a terpolymer of claim 1 which comprises:
heating a mixture of said maleic anhydride and said acrylamide or methacrylamide in a chain transfer solvent mixture to at least 120° C., introducing from 2 to 20 weight percent free radical initiator and said third monomer and continuing to maintain said mixture at a temperature of at least about 120° C until polymerization is essentially complete, said chain transfer solvent mixture being from 15 to 85 weight percent aromatic solvent selected from the group consisting of mono and dialkyl substituted benzene having from 1 to 4 carbon atoms in each alkyl group and trialkyl substituted benzene having from 1 to 2 carbon atoms in each alkyl group, and from 15 to 85 weight percent ketone solvent selected from the group consisting of dialkyl ketone having from 1 to 5 carbon atoms in each alkyl group and cycloalkyl ketone having from 5 to 8 carbon atoms in the cycloalkyl group.

10. A process of claim 9 which includes the steps of isolating said terpolymer after polymerization and treating said terpolymer with water at a temperature below about 30° C. to remove unreacted monomer.

11. The process of claim 9 wherein the terpolymer consists essentially of 41 to 46 mole percent maleic anhydride, 45 to 49 mole percent acrylamide and 9 to 13 mole percent styrene.

12. The process of claim 9 wherein said chain transfer solvent mixture is composed of substantially equal amounts of xylene and methyl isobutyl ketone.

* * * * *